Oct. 6, 1964    T. ROWLANDS    3,151,513
CUTTING APPARATUS
Filed June 24, 1958
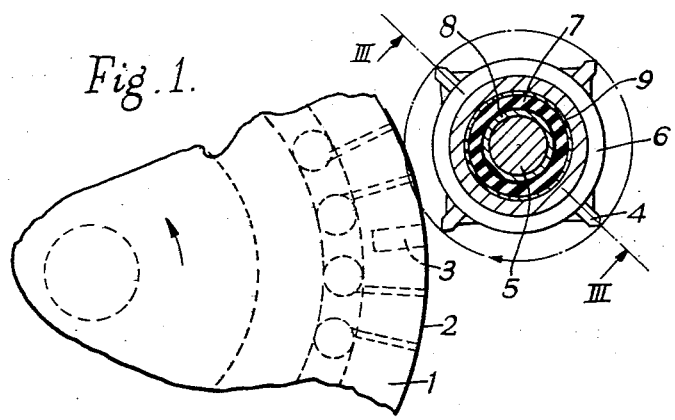
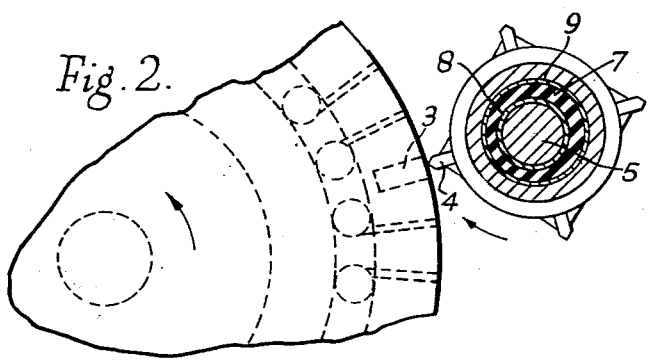
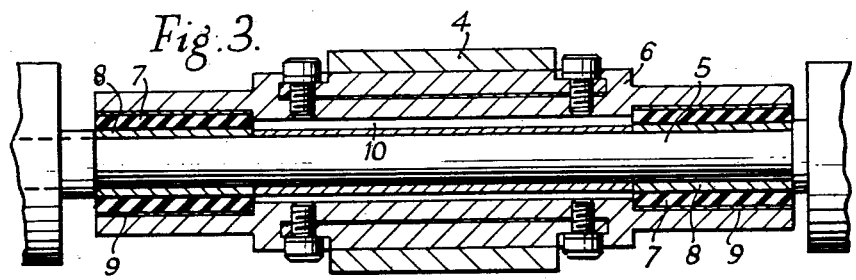
INVENTOR
Tom Rowlands
BY
Watson, Cole, Grindle
& Watson
ATTORNEYS United States Patent Office 3,151,513
Patented Oct. 6, 1964

3,151,513
CUTTING APPARATUS
Tom Rowlands, Deptford, London, England, assignor to Molins Machine Company Limited, London, England, a British company
Filed June 24, 1958, Ser. No. 744,148
Claims priority, application Great Britain, July 3, 1957, 21,005/57
2 Claims. (Cl. 83—346)

This invention concerns improvements in or relating to cutting apparatus in which a cutting element or knife mounted on a rotating carrier is arranged to cut material, such as a web of cigarette-tipping material, against a hard surface, for example the surface of a conveyor drum. For convenience such apparatus will be referred to as "cutting apparatus as specified."

To enable the cutting element or knife to penetrate the material and make a clean cut it is desirable that it should be yieldingly pressed against the hard surface.

According to the present invention there is provided cutting apparatus comprising a conveyor with a conveying surface for material to be cut, a rotatable shaft spaced from said surface, a tubular knife-carrying member rotatable with and encircling said shaft, deformable means of resilient material interposed between and separating said knife-carrying member from said shaft, and at least one knife detachably carried by said knife-carrying member, the said shaft being so spaced from the said surface that the said knife-carrying member is displaced away from said surface each time a knife engages the said surface, said deformable means yielding to permit such displacement.

For example the device may comprise a rubber bush arranged between the shaft and the knife-carrying member.

By means of this arrangement any desired number of knives may be mounted on the knife carrier and each will be able to yield resiliently when brought into contact with the surface against which it cuts.

Apparatus in accordance with the invention will now be described by way of example with reference to the accompanying drawing, in which:

FIGURE 1 is a sectional end elevation;
FIGURE 2 is a view similar to FIGURE 1 with the parts in different positions; and
FIGURE 3 is a section on the line III—III, FIGURE 1.

FIGURES 1 and 2 show a fragment of a suction conveyor drum 1 which rotates in the direction shown by the arrow and which carries on its peripheral surface a web 2 of cork-tipping material which is to be cut into lengths, which are to be used as uniting bands for uniting groups of cigarettes and stubs in the manufacture of mouthpiece cigarettes.

The drum 1 is provided with hardened insets 3 at the positions at which the web is to be cut.

A rotatable knife-carrier provided with four equispaced knives 4 comprises a shaft 5 arranged for rotation in timed relationship with the drum 1, and a tubular knife-carrying member 6 to which the knives 4 are fixed by means of set-screws passing through the ends of the knives into the member 6, so that the knives are readily detachable when wear makes their replacement necessary. The member 6 is spaced from the shaft 5 by two rubber bushes 7 which lie between and are bonded to sleeves 8 and 9.

The shaft 5 is arranged so that the edges of the knives would, if free to do so, move in the circular path indicated in FIGURE 1 by the dot-and-dash circle, that is, in a path which overlaps the periphery of the drum. As can be seen in FIGURE 2, however, when a knife engages a hardened inset 3 the rubber bushes 7 are deformed so that the whole knife-carrying member 6 becomes displaced away from the drum. The same thing occurs each time a knife 4 engages an inset 3 on the drum, so that each knife yields resiliently when brought into contact with the surface against which it cuts.

As can be seen in FIGURE 3, the part of the member 6 between the bushes 7 is separated from the shaft by a space 10, so that the member 6 can be displaced in any direction radially of the shaft.

What I claim as my invention and desire to secure by Letters Patent is:

1. Cutting apparatus comprising a conveyor with a conveying surface for material to be cut, a rotatable shaft spaced from said surface, a tubular knife-carrying member rotatable with and encircling said shaft, deformable means of resilient material interposed between and separating said knife-carrying member from said shaft, and at least one knife detachably carried by said knife-carrying member, the said shaft being so spaced from the said surface that the said knife-carrying member is displaced away from said surface each time a knife engages the said surface, said deformable means yielding to permit such displacement.

2. Apparatus as claimed in claim 1, in which the said deformable means comprises a rubber bush arranged between the shaft and the knife-carrying member and encircling the shaft.

References Cited in the file of this patent
UNITED STATES PATENTS

| | | |
|---|---|---|
| 461,600 | West | Oct. 20, 1891 |
| 2,265,649 | Krehbiel | Dec. 9, 1941 |
| 2,291,227 | Iknayan | July 28, 1942 |
| 2,682,306 | Schriber | June 29, 1954 |
| 2,745,491 | Sonneborn | May 15, 1956 |
| 2,801,439 | Meares | Aug. 6, 1957 |
| 3,008,366 | Taylor | Nov. 14, 1961 |

FOREIGN PATENTS

| | | |
|---|---|---|
| 480,861 | Germany | Aug. 9, 1929 |